March 2, 1937.　　　　C. T. WALTER　　　　2,072,660
COVERING IN MEAT PRODUCTS
Filed April 16, 1934
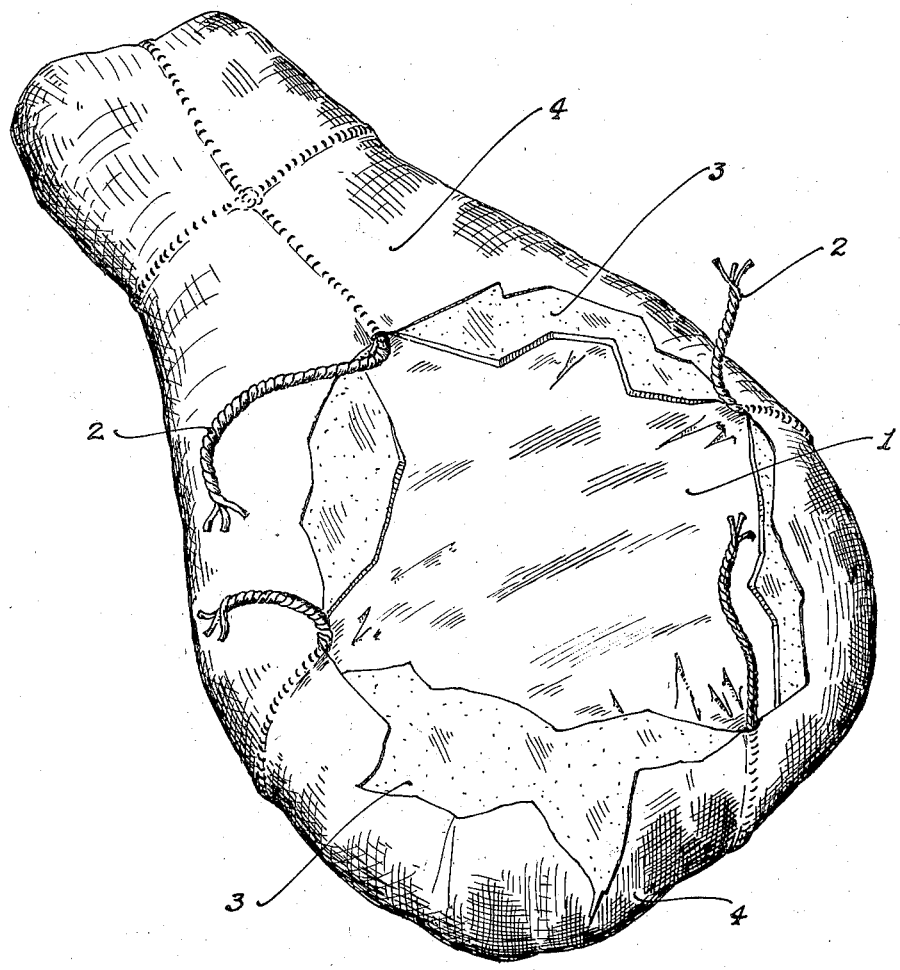
Charles T. Walter.
INVENTOR
WITNESS -
BY
ATTORNEY Patented Mar. 2, 1937

2,072,660

UNITED STATES PATENT OFFICE 2,072,660

COVERING IN MEAT PRODUCTS

Charles T. Walter, Chicago, Ill., assignor to Industrial Patents Corporation, Chicago, Ill., a corporation of Delaware Application April 16, 1934, Serial No. 720,694

2 Claims. (Cl. 99—174)

This invention relates to a protective covering for meats.

One of the objects of the invention is to provide a protective covering for cured joint meats such as ham.

Another object of the invention is to provide a strong, tough, transparent wrapper which is substantially impervious to moisture. Other objects will be apparent from the description and claims which follow.

The drawing is a perspective view of a ham wrapped in accordance with the present invention with the two outer layers broken away to show the several elements which make up the wrapper.

Although the embodiment of the invention disclosed in the drawing is exemplified by a ham it will be understood that the wrapper of the present invention may be employed with other meats and food products.

The ham is first wrapped in a sheet of transparent cellulose 1, which may be moistureproofed by known expedients and held in place as by string 2, and is then dipped in a suitable gelatin solution, forming a gelatin layer 3. The gelatin coating is dried, forming a strong, tough, protection for the moistureproof cellulose sheet. Any desired number of coats of gelatin may be applied. After the gelatin coating has dried it is covered with a suitable moistureproof material 4 such as varnish or pyroxylin lacquer.

The varnish or lacquer may be applied by dipping, spraying or brushing. When the varnish has dried, the product is ready for shipment.

It will be seen that the present invention provides a novel wrapper of improved characteristics.

The cellulose sheet protects the surface of the meat from contamination and forms a base for the strong, tough, gelatin layer, and being moistureproof, protects the gelatin from the softening action moisture originating in the product.

The relatively thick gelatin layer forms a strong, tough, transparent shell over the cellulose sheeting protecting it from rupture or other damage in handling.

The waterproof coating applied to the outer surface of the gelatin protects it from the softening or dissolving action of moisture from outside sources.

The wrapper of the present invention provides a substantially moistureproof, strong, tough, transparent wrapper having a pleasing appearance, possessing all the advantages of a transparent wrapper and yet strong and durable enough to render further wrapping superfluous.

The wrapper of the present invention forms an integral covering conforming to the surface of the uneven contour of the meat, yieldable and yet substantially non-deformable and non-breakable, exhibiting the advantages of a gelatin coating at its best without its disadvantages.

I claim:

1. A covering for meat products comprising cellulose sheeting adjacent the meat surface, a coating of gelatin adherent to said cellulose sheeting and a moistureproof coating on the outer surface of said gelatin coating.

2. A gelatin coating for meat products protected from the moisture of the meat by a moistureproof sheet and from external moisture by a moistureproof coating.

CHARLES T. WALTER.